United States Patent
Hayashi et al.

(10) Patent No.: US 9,162,302 B2
(45) Date of Patent: Oct. 20, 2015

(54) MANUFACTURING METHOD OF ELECTRODE FOR HONEYCOMB STRUCTURE FORMING DIE

(75) Inventors: Seiichiro Hayashi, Nagoya (JP); Tomoki Nagae, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 803 days.

(21) Appl. No.: 13/316,903

(22) Filed: Dec. 12, 2011

(65) Prior Publication Data

US 2012/0175349 A1 Jul. 12, 2012

(30) Foreign Application Priority Data

Dec. 15, 2010 (JP) ................................. 2010-279796

(51) Int. Cl.
| | | |
|---|---|---|
| *B23H 5/00* | (2006.01) | |
| *B23K 9/00* | (2006.01) | |
| *B23H 1/04* | (2006.01) | |
| *B23H 1/06* | (2006.01) | |
| *B23H 9/00* | (2006.01) | |

(52) U.S. Cl.
CPC .............. *B23H 9/00* (2013.01); *B23H 2200/30* (2013.01)

(58) Field of Classification Search
CPC .............. B23H 1/04; B23H 7/22; B23H 9/12; B23H 9/00; B23H 2200/30; B28B 3/269
USPC ......................... 219/68, 69.1, 70, 69.11–69.2, 219/78.11–78.12, 780; 29/888.3, 527.2, 29/874
See application file for complete search history.

(56) References Cited

U.S. PATENT DOCUMENTS

| | | | | |
|---|---|---|---|---|
| 4,902,216 A | * | 2/1990 | Cunningham et al. | 425/463 |
| 5,008,509 A | * | 4/1991 | Hattori et al. | 219/69.15 |
| 5,487,863 A | * | 1/1996 | Cunningham et al. | 264/177.11 |
| 5,714,228 A | * | 2/1998 | Beckmeyer et al. | 428/118 |
| 5,728,286 A | * | 3/1998 | Suzuki et al. | 205/640 |
| 5,731,562 A | * | 3/1998 | Beckmeyer et al. | 219/69.12 |
| 5,997,720 A | * | 12/1999 | Brew et al. | 205/646 |

(Continued)

FOREIGN PATENT DOCUMENTS

| | | |
|---|---|---|
| JP | S45-013796 B | 5/1970 |
| JP | 04-074131 B2 | 11/1992 |

(Continued)

OTHER PUBLICATIONS

Extended European Search Report dated Apr. 2, 2012.

(Continued)

*Primary Examiner* — Dana Ross
*Assistant Examiner* — Gyounghyun Bae
(74) *Attorney, Agent, or Firm* — Burr & Brown, PLLC

(57) ABSTRACT

By providing a manufacturing method of an electrode for a honeycomb structure forming die including: arranging a plurality of processing electrodes 161 having a shape which is complementary to that of the flow-through cells, at positions corresponding to the plurality of flow-through cells in the one surface 107B of the electrode base body 102B; discharging electricity from the plurality of processing electrodes 161 toward the one surface 107B of the electrode base body 102B to carve the electrode base body 102B, so that a plurality of electrode cells having a shape which is analogous to that of the flow-through cells are formed in the electrode base body 102B; whereby obtaining a honeycomb electrode where a plurality of electrode cells partitioned by electrode partition walls appear on the one surface.

6 Claims, 9 Drawing Sheets

(56) References Cited

U.S. PATENT DOCUMENTS

| | | | |
|---|---|---|---|
| 6,080,348 A * | 6/2000 | Shalkey | 264/177.12 |
| 6,299,813 B1 * | 10/2001 | Brew et al. | 264/177.12 |
| 6,320,150 B1 * | 11/2001 | Hironaga | 219/69.12 |
| 6,991,450 B1 * | 1/2006 | Stephens, II | 425/461 |
| 7,163,389 B2 * | 1/2007 | Miyazaki et al. | 425/380 |
| 8,263,895 B2 * | 9/2012 | Humphrey | 219/69.15 |
| 2001/0045366 A1 * | 11/2001 | Iwata et al. | 205/665 |
| 2002/0153356 A1 * | 10/2002 | Fujita et al. | 219/69.17 |
| 2003/0042229 A1 * | 3/2003 | Marcher | 219/69.17 |
| 2003/0064126 A1 * | 4/2003 | Miyazaki et al. | 425/461 |
| 2004/0161583 A1 * | 8/2004 | Brew et al. | 428/116 |
| 2005/0198822 A1 | 9/2005 | Hironaga et al. | |
| 2005/0274097 A1 * | 12/2005 | Beall et al. | 55/523 |
| 2008/0017520 A1 * | 1/2008 | Koishikura et al. | 205/640 |
| 2008/0135141 A1 * | 6/2008 | Fujita | 148/712 |
| 2008/0196237 A1 * | 8/2008 | Shinya et al. | 29/557 |
| 2009/0081325 A1 * | 3/2009 | Kitamura et al. | 425/461 |
| 2010/0244309 A1 * | 9/2010 | Hayashi et al. | 264/177.12 |
| 2012/0174397 A1 * | 7/2012 | Nagae et al. | 29/874 |

FOREIGN PATENT DOCUMENTS

| | | |
|---|---|---|
| JP | 07-040149 A1 | 2/1995 |
| JP | 08-187621 A1 | 7/1996 |
| JP | 2002-079423 A1 | 3/2002 |
| JP | 2005-254345 A1 | 9/2005 |
| JP | 2010-234515 A1 | 10/2010 |

OTHER PUBLICATIONS

Japanese Office Action dated Jan. 15, 2013 (with English translation).

* cited by examiner

MANUFACTURING METHOD OF ELECTRODE FOR HONEYCOMB STRUCTURE FORMING DIE

FIELD OF THE INVENTION

The present invention relates to a manufacturing method of an electrode for use in processing a die. The die is used for forming a honeycomb structure.

BACKGROUND OF THE INVENTION

A honeycomb structure is usually a ceramic product whose outer shape is a columnar shape or a prism shape. This honeycomb structure includes a plurality of cells defined by partition walls being made of a ceramic porous material and having a large number of pores, whose shape looks like a honeycomb nest. Such a honeycomb structure including the cells which become through channels of a gas is often used as a filter or a catalyst carrier.

The honeycomb structure can be manufactured through extrusion of a forming raw material by use of an extrusion forming machine to which a honeycomb structure forming die for exclusive use (also simply referred to as die) is attached. This die is obtained by forming, in a die base body made of a pure metal, an alloy or the like, back holes (often referred to as the introduction holes) through which the forming raw material (often referred to as the kneaded clay) is introduced, and slits which communicate with the back holes. The slits have a shape matching a sectional shape of cells, and has a width corresponding to a thickness of each partition wall of the honeycomb structure. Each of the back holes has a diameter larger than a width of each slit, and the back holes are provided at positions corresponding to intersections of the slits. According to the extrusion forming by use of such a die, the forming raw material introduced through the back holes moves toward the slits each having a small width, is extruded through the slits, and is discharged as a honeycomb-structure formed body (often referred to as the honeycomb formed body). Then, the honeycomb formed body is fired, whereby the honeycomb structure can be obtained.

Such a die can be obtained by forming the above slits and back holes in the die base body which is not provided with any slit or back hole. Examples of slit forming means include electric discharge machining (EDM) using an electrode, cutting, grinding, and electrolytic machining. For example, Patent Documents 1 and 2 disclose means for manufacturing a die which forms a honeycomb structure including cells having a hexagonal sectional shape. In Patent Documents 1 and 2, a combtooth-like electrode including a large number of thin flat plate-like projections adjusted to the slits is used. Moreover, the slits are processed by discharging electricity from the thin flat plate-like projections.

PRIOR ART DOCUMENT

[Patent Document 1] Japanese Patent No. 1784822
[Patent Document 2] JP-A-2005-254345

SUMMARY OF THE INVENTION

In recent years, it has been requested to increase the cell density and reduce the thickness of partition walls in the honeycomb structure so that a performance of a filter or a catalyst carrier is enhanced. For example, in the honeycomb structure including cells having a hexagonal sectional shape, it is required that the cell density is from 400 to 900 cells/square inch and the thickness of each partition wall is from 1.5 to 6 mils. One inch is approximately 2.54 cm and one mil is approximately 0.0254 mm. At this time, the distance between two opposing sides of the hexagonal shape which is the sectional shape of the cells (also referred to as the opposing side length) is from about 0.50 to 2.00 mm.

If the partition walls of the honeycomb structure, i.e., the thicknesses thereof become thin, slits of a die, i.e., the widths thereof thus have to be narrowed or made finer. Further for narrowing the widths of the die slits according to conventional technologies disclosed in Patent Documents 1 and 2, flat plate-like projections of a combtooth-like electrode for use in electric discharge machining need to be thinned. However, when the flat plate-like projections of the combtooth-like electrode are thinned, the projections easily break or fracture. When the flat plate-like projections of the combtooth-like electrode break, for example, during the electric discharge machining of the die, there is a strong possibility that the shape of the obtained die becomes abnormal. Moreover, when the forming is performed by using the die, the shape of the obtained honeycomb structure also becomes abnormal, which eventually leads to the deterioration of yield of a ceramic product.

The investigations of countermeasures under awareness of such problems have resulted in an idea that when an electrode having a shape which is complementary to all or part of a die shape is used for obtaining the die, the electrode does not easily break during the electric discharge machining, as compared with the combtooth-like electrode. However, for obtaining the honeycomb structure including thin partition walls, the slits of the die unchangeably have to be narrow or fine. Even when the electrode shape is formed to be complementary to the die shape, electrode portions corresponding to the slits need to be thinned. Therefore, if the electrode does not break during the electric discharge machining, the electrode is deformed sometimes. Therefore, further improvements are required so that the electrode does not break or facture or is not deformed. Additionally, when the electrode having the shape which is complementary to the whole die shape and including thin portions corresponding to the slits is prepared by, for example, wire electric discharge machining, much time is required. Therefore, means for preparing the electrode in a short time is also required.

The present invention has been developed in view of such situations. An object of the present invention is to provide means for obtaining, in a short time, an electrode which can manufacture a die including narrow or fine slits to obtain a honeycomb structure including thin partition walls and which does not break or is not deformed during electric discharge machining for obtaining the die including the narrow slits. As a result of repeated researches, it has been found that this object can be achieved by the following means, to complete the present invention.

That is, according to the present invention, there is provided a manufacturing method of an electrode for a honeycomb structure forming die which forms a honeycomb structure including a plurality of flow-through cells partitioned by porous partition walls, the method comprising: preparing a thick plate-like electrode base body made of an electricity discharging material and having two surfaces; arranging one or more processing electrodes having a shape which is complementary to that of the flow-through cells, at positions corresponding to the plurality of flow-through cells in one of the surfaces of the electrode base body; discharging electricity from the one or more processing electrodes toward the surface of the electrode base body to carve the electrode base body, so that a plurality of electrode cells having a shape which is analogous to that of the flow-through cells are formed in the electrode base body; whereby obtaining an electrode where a plurality of electrode cells partitioned by electrode partition walls appear on at least one of the surfaces thereof.

The manufacturing method of the electrode for the honeycomb structure forming die according to the present invention is a method of manufacturing the electrode for use in the processing of the honeycomb structure forming die, and the die is the honeycomb structure forming die. The honeycomb structure forming die is a die to be used for forming the honeycomb structure. More strictly, the die is for use in passing a forming raw material, which is the kneaded clay made of a ceramic material as a main material, to obtain a formed body having a honeycomb shape, that is, the honeycomb formed body which is not'yet fired. In other words, the die is a die used for forming. However, since the expression "electrode for a die for forming a honeycomb structure" is verbose, in the present description, the electrode which is a manufacturing object of the present invention will be referred to simply as electrode, and also as honeycomb electrode.

A shape corresponding to a sectional shape of the honeycomb structure appears in a die shape, and a shape corresponding to the die shape appears on a shape of the electrode for the honeycomb structure forming die. Further in the manufacturing method of the electrode for the honeycomb structure forming die according to the present invention, a shape corresponding to that of the electrode for the honeycomb structure forming die appears on a shape of processing electrodes. Here, it is described that each shape appears. Specifically, for example, a shape of slits (recess portions) of the die becomes complementary to that of the porous partition walls (projecting portions) of the honeycomb structure. Moreover, a shape of electrode partition walls (projecting portions) of the electrode for the honeycomb structure forming die becomes complementary to that of the slits (recess portions) of the die. Furthermore, a shape of the processing electrodes (projecting portions) becomes complementary to that of electrode cells (recess portions) of the electrode. The complementary shape is a mutually compensating shape. The complementary shape is a shape integrated by fitting or engaging as in, for example, the recess portions and the projecting portions. However, the complementary shape in the present description is not necessarily limited to an engaged shape which does not have any gap. The electric discharge machining usually requires a machining margin, and hence a gap corresponding to the machining margin or a shift is allowed.

Moreover, the shape becomes complementary. In other words, the shape is complementarily transferred. When manufacturing steps are traced back from the honeycomb structure, the shapes of the honeycomb structure, the die, the electrode for the honeycomb structure forming die and the processing electrodes are transferred in order. Conversely, when the manufacturing steps are considered in order, the shapes of the processing electrodes, the electrode, the die and the honeycomb structure are transferred in order. The complementary shape of the complementary shape returns to the original shape when the machining margin is not considered, and hence the shape of the electrode cells of the electrode for the honeycomb structure forming die becomes analogous to or resembles that of the flow-through cells of the honeycomb structure. Each of the electrode partition walls of the electrode for the honeycomb structure forming die has a thickness which is different from that of each porous partition wall of the honeycomb structure. Therefore, as a whole, the shape of the electrode for the honeycomb structure forming die is not strictly analogous to that of the honeycomb structure, but is schematically similar thereto. That is, the electrode for the honeycomb structure forming die includes the plurality of electrode cells partitioned by the electrode partition walls for the honeycomb structure including the plurality of flow-through cells partitioned by the porous partition walls. Therefore, the electrode for the honeycomb structure forming die is referred to as the honeycomb electrode. Moreover, the terms "partition walls" and "cells" are also used to mean the electrode partition walls and the electrode cells, respectively, in this honeycomb electrode, and hence the terms "porous partition walls" and "flow-through cells" are used in case of the honeycomb structure in the description of the present specification. On the other hand, the complementary shape of the complementary shape of the complementary shape is still a complementary shape. Therefore, the shape of the honeycomb structure is complementarily transferred to the shape of the processing electrodes via the die and the honeycomb electrode. The one or more processing electrodes having the shape which is complementary to that of the flow-through cells has such a meaning. That is, the shape of the processing electrodes is not directly transferred to the honeycomb structure.

It can be considered that the flow-through cells are spaces or small partitions partitioned by the porous partition walls which are substantive parts. The shape of the flow-through cells is a shape of the small partitions substantially formed by the porous partition walls. If an outer shape of the honeycomb structure shows a column shape having two end surfaces and a peripheral surface, a sectional shape of the flow-through cells appears on a section of the honeycomb structure vertical to an axial direction. The shape of the flow-through cells as the small partitions is, for example, a hexagonal column, and in this case, the sectional shape of the flow-through cells is a hexagonal shape. The substantive processing electrodes form a shape which is complementary to that of the flow-through cells as the spaces. Therefore, when the shape of the flow-through cells as the small partitions or spaces is the hexagonal column, the shape of the processing electrodes is a substantive hexagonal column. Moreover, the sectional shape of the processing electrodes in a section vertical to the axial direction is a hexagonal shape.

The electrode base body is processed to become the electrode for the honeycomb structure forming die, and the processing electrodes discharge the electricity to process the electrode base body. Therefore, a length of each processing electrode having the shape which is complementary to that of the flow-through cells does not have to be a length of each flow-through cell, i.e., a distance between two end surfaces of the honeycomb structure, and may be a length corresponding to a thickness of the thick plate-like electrode base body having two surfaces.

It can be considered that the electrode cells are spaces or small partitions partitioned by the electrode partition walls which are substantive parts. The electrode partition walls are portions of the electrode base body which are not carved, or processed by the electricity discharging. The processing electrodes have the shape which is complementary to that of the flow-through cell, and the electrode cells have the shape which is complementary to that of the processing electrodes. Therefore, the flow-through cells and the electrode cells, both as small partitions, have an analogous shape. When the shape of the flow-through cells as the small partitions is the hexagonal column, the shape of the electrode cells as the small partitions is also the hexagonal column. Moreover, the sectional shape of the electrode cells is a hexagonal shape. The sectional shape of the electrode cells appears on the section of the thick plate-like electrode base body which is vertical to the shortest direction along which the two surfaces of the electrode base body are connected.

When the processing electrodes having the shape which is complementary to that of the flow-through cells discharge the electricity to advance the carving of the unprocessed thick plate-like electrode base body, the electrode cells or small partitions having the shape which is complementary to that of the substantive processing electrodes are formed in the electrode base body. Therefore, when the one or more processing electrodes are used and arranged at the positions corresponding to the plurality of flow-through cells to perform the electric discharge machining, the plurality of electrode cells partitioned by the electrode partition walls are formed in the electrode base body. The one or more processing electrodes are arranged at the positions corresponding to the plurality of flow-through cells. Specifically, at these positions, the center of the sectional shape, e.g., the hexagonal shape of the flow-through cells matches the center of the sectional shape, e.g., the hexagonal shape of the processing electrodes. Moreover, the shape of the die is the complementary shape of the honeycomb electrodes, and the shape of the electrode cells constituting the honeycomb electrode is the complementary shape of the processing electrodes. Therefore, the whole shape or the configuration of the positioned one or more processing electrodes is schematically similar to that of the die.

Any surface of the electrode base body is one of the surfaces of the thick plate-like electrode base body having two surfaces. Since the electrode base body has a thick plate-like shape, the surface thereof can be present also in a thickness direction, but the two surfaces indicate two main surfaces, i.e., the front surface and the back surface which are not disposed in the thickness direction. When it is described that the plurality of electrode cells partitioned by the electrode partition walls appear, it is meant that all or part of the shape corresponding to the end surface shape or the sectional shape of the honeycomb structure appears on the processed and obtained electrode for the honeycomb structure forming die. The sectional shape of the honeycomb structure is a shape of a section of the honeycomb structure which is vertical to an axial direction of the honeycomb structure whose outer shape usually shows a columnar member or a prism member.

In the die or the electrode, all or part of the shape corresponding to the end surface shape or the sectional shape of the honeycomb structure, i.e., the complementary shape or the schematically similar shape may appear. When the electric discharge machining is performed by using a honeycomb electrode in which all of the shape corresponding to the end surface shape or the sectional shape of the honeycomb structure appears on any surface, it is possible to complete the die at a time. The honeycomb electrode may be called as a full-size honeycomb electrode including a fringe portion (described in detail later). Moreover, when the electric discharge machining is performed by using a honeycomb electrode in which part of the shape corresponding to the sectional shape of the honeycomb structure appears on at least one surface, which may be called as a partial-size honeycomb electrode which does not include any fringe portion (described in detail later), it is also possible to complete the die by repeatedly using the partial-size honeycomb electrode.

The honeycomb electrode discharges the electricity during the processing of the die. Moreover, the honeycomb electrode itself can be obtained by forming the electrode base body into the shape corresponding to the honeycomb structure through the electric discharge machining by use of the processing electrodes. There is no doubt that both the honeycomb electrode and the processing electrode are electricity discharging electrodes.

In the manufacturing method of the electrode for the honeycomb structure forming die according to the present invention, a plurality of holes are preferably made at positions of the electrode base body corresponding to the plurality of flow-through cells before discharging the electricity. In this case, the holes are further preferably through holes passing through a portion between the two surfaces of the electrode base body. As to the through holes, the shape of the section of each of the holes which is vertical to the thickness direction of the electrode base body, i.e., the sectional shape of the through holes may be a polygonal shape such as a quadrangular shape, but is preferably a round shape. In this case, the made holes are round holes. There is not any special restriction on means for making the through holes in the electrode base body, and, for example, machining such as drilling or the like, electric discharge machining or the like can be used.

In the manufacturing method of the electrode for the honeycomb structure forming die according to the present invention, when the plurality of processing electrodes are arranged, the plurality of processing electrodes are preferably integrated through a support portion.

The manufacturing method of the electrode for the honeycomb structure forming die according to the present invention is preferably used in a case where a sectional shape of the electrode cells is a hexagonal shape. This is a case where a shape of the electrode cells which are small partitions is a hexagonal column. This electrode for the honeycomb structure forming die is the electrode for the die which forms the honeycomb structure including the plurality of flow-through cells whose sectional shape is a hexagonal shape.

The manufacturing method of the electrode for the honeycomb structure forming die according to the present invention is preferably used in a case where the sectional shapes of the electrode cells are an octagonal shape and a quadrangular shape. This is a case where the shapes of the electrode cells which are the small partitions are an octagonal column and a quadrangular column. This electrode for the honeycomb structure forming die is the electrode for the die which forms the honeycomb structure in which sectional shapes of the plurality of flow-through cells are constituted of a plurality of octagonal shapes and a plurality of quadrangular shapes which are disposed alternately.

EFFECTS OF THE INVENTION

According to a manufacturing method of an electrode for a honeycomb structure forming die of the present invention, one or more processing electrodes having a shape which is complementary to that of flow-through cells are arranged at positions corresponding to the plurality of flow-through cells in any surface of an electrode base body, and electricity is discharged from the one or more processing electrodes toward the surface of the electrode base body, so that a plurality of electrode cells having a shape which is analogous to that of the flow-through cells are formed in the electrode base body. There is obtained the honeycomb electrode in which the plurality of electrode cells partitioned by electrode partition walls appear on at least one of the surfaces of the electrode. Therefore, as compared with a combtooth-like electrode including flat plate-like projections, the electrode partition walls can further be thinned or made finer while maintaining a desirable shape. In consequence, the honeycomb electrode manufactured by the manufacturing method of the electrode for the honeycomb structure forming die according to the present invention is suitable as an electrode for use in obtaining a die including narrower or finer slits. Moreover, according to the die including the narrower or finer slits, it is possible to form a honeycomb structure including thinner porous partition walls. For example, according to the manufacturing method of the electrode for the honeycomb structure forming die of the present invention, 0.01 mm is realized as a thickness of each electrode partition wall of the obtained honeycomb electrode. In the conventional combtooth-like electrode, the flat plate-like projections themselves are arranged away from one another, and cannot keep strength, and for maintaining the desirable shape, a thickness of each flat plate-like projection has a limit of 0.03 mm.

According to a preferable configuration of the manufacturing method of the electrode for the honeycomb structure forming die of the present invention, a plurality of through holes are made at positions corresponding to the plurality of flow-through cells of the electrode base body, before discharging the electricity. Therefore, processed sludge can quickly be discharged from processed portions, and it is possible to continuously perform stable electric discharge machining. If the sludge just generated by the processing remains, the electricity discharging becomes unstable, and a processing defect might be generated. However, according to the preferable configuration of the manufacturing method of the electrode for the honeycomb structure forming die of the present invention, such a problem does not easily occur. For example, when an electric discharge machining oil is sucked or jetted through the through holes on a side opposite to a side on which the processing electrodes are arranged, the sludge generated by the processing can be discharged through the processed portions through a flow of the electric discharge machining oil. The through holes preferably have a size such that the sludge can suitably be discharged through the through holes and that the strength of the electrode base body or the honeycomb electrode is not influenced. When the electrode cells pass through the portion between the two surfaces of the electrode base body or the honeycomb electrode, the whole through holes become so-called precursor holes of the electrode cells. Moreover, even when the electrode cells do not pass through the portion between the two surfaces of the electrode base body or the honeycomb electrode, through hole portions corresponding to portions provided with the electrode cells become the precursor holes of the electrode cells. Therefore, when the size of each through hole that is to become the precursor hole of this electrode cell is set to be close to that of each electrode cell, a processing amount becomes small, less sludge is generated, and the stable electric discharge machining can be performed.

Since the honeycomb electrode which is a manufacturing object of the present invention is used for processing the die, the plurality of electrode cells partitioned by the electrode partition walls may appear on at least one surface of this honeycomb electrode. In other words, the electrode cells do not have to pass through the portion between the two surfaces of the electrode base body or the honeycomb electrode. In this case, the plurality of electrode cells partitioned by the electrode partition walls may appear only on one surface of the honeycomb electrode. Moreover, any hole is not present or the above through holes are open in the surface of the honeycomb electrode on which any electrode cell does not appear. The honeycomb electrode having such a configuration has a higher strength as compared with a honeycomb electrode through which the electrode cells pass. Furthermore, even when the through holes are made, the through holes may have a size to such an extent that the sludge can suitably be discharged as described above. When the through holes are made, the through holes do not have to pass with the same sectional shape, e.g., a round shape. For example, portions which become the above precursor holes of the electrode cells are made to be as large as the shape of the electrode cells, and only part of the remaining portions, e.g., only about ⅓ of the round sectional shape passes through the honeycomb electrode. In such a configuration, the strength becomes higher. The manufacturing method of the electrode for the honeycomb structure forming die according to the present invention is means for arranging one or more processing electrodes having the shape which is complementary to the flow-through cells, at positions corresponding to the plurality of flow-through cells in any surface of the electrode base body, and discharging the electricity from the one or more processing electrodes toward any surface of the electrode base body to carve the electrode base body. Therefore, when this carving degree or depth is adjusted, it is possible to easily obtain the honeycomb electrode in which the plurality of electrode cells partitioned by the electrode partition walls appear only on one surface thereof and which is excellent in strength. This honeycomb electrode which is excellent in strength does not easily break or is not easily deformed during the electric discharge machining for obtaining the die.

In the manufacturing method of the electrode for the honeycomb structure forming die according to the present invention, one or more processing electrodes are arranged at the positions corresponding to the plurality of flow-through cells. In a preferable configuration of the method, the plurality of processing electrodes are integrated through a support portion. Therefore, the electricity is simultaneously discharged from the plurality of processing electrodes toward the surface of the electrode base body to advance the carving of the electrode base body, so that the plurality of electrode cells having a shape which is analogous to that of the flow-through cells can be formed in the electrode base body. In consequence, according to the preferable configuration of the manufacturing method of the electrode for the honeycomb structure forming die of the present invention, it is possible to prepare the honeycomb electrode in a short time. On conditions of the same processing, processing time or the number of process steps may be 20% or can be saved by 80%, as compared with a case where the processing is performed by using a wire electric discharge machine (WEDM).

BRIEF DESCRIPTION OF THE DRAWINGS

FIGS. 3A, 3B, 4, 5, 6A and 9 are drawn with a transparent base body in order to better demonstrate the shape and positioning of the electrode cells and round holes within the base body.

DETAILED DESCRIPTION OF THE INVENTION

Figure 1:
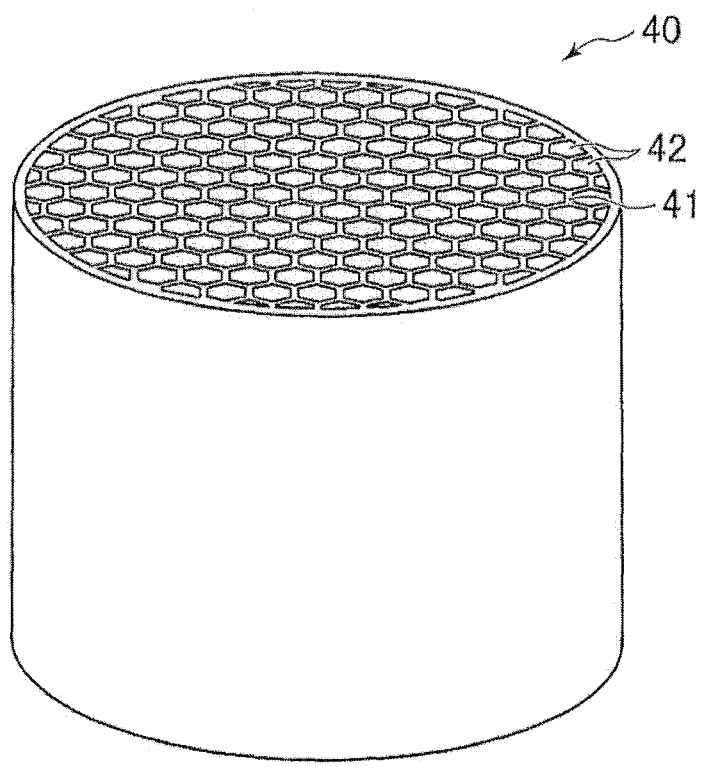
FIG. 1 is a perspective view schematically showing an example of a honeycomb structure.

Hereinafter, embodiments of the present invention will appropriately be described with reference to the drawings, but it should be understood that the present invention is not limited to these embodiments when interpreted and that various changes, modifications and improvements can be added on the basis of the knowledge of a person skilled in the art, without departing from the scope of the present invention. For example, the drawings show preferable embodiments of the present invention, but the present invention is not limited by configurations or information shown in the drawings. When the present invention is performed or verified, means similar or equivalent to those described in the present description can be applied, but suitable means are described hereinbelow.

The drawings for use in the following description are schematic views, and in the respective drawings, the number of constituent elements, e.g., electrode cells or electrode partition walls does not necessarily match or is smaller than the practical number thereof. This is because the respective drawings are drawn to facilitate the understanding of invention concepts and processing steps. For example, the number of the electrode cells concerned with a honeycomb electrode is 12 in FIG. 3A, FIG. 3B, FIG. 4 and FIGS. 7, and 16 in FIG. 5 and FIG. 8. However, needless to say, it should be understood that the practical number of the electrode cells becomes a necessary number in accordance with specifications of a honeycomb structure forming die to be obtained, e.g., a die 1 shown in FIG. 2A to FIG. 2C and further specifications of a honeycomb structure, e.g., a honeycomb structure 40 shown in FIG. 1.

The present invention is a method of manufacturing a honeycomb electrode for use in processing a die, and the die is for use in forming a honeycomb structure. Therefore, a honeycomb structure, a honeycomb structure forming die and an electrode for the honeycomb structure forming die as a manufacturing object will first be described.

[Honeycomb Structure] A honeycomb structure 40 illustrated in FIG. 1 has an outer shape showing a columnar shape having two end surfaces and a peripheral surface. The honeycomb structure is a ceramic product including therein a plurality of flow-through cells 42. The flow-through cells 42 are spaces which become through channels of a gas, and are partitioned by ceramic porous partition walls 41 each including a large number of pores. In the honeycomb structure 40, a sectional shape of the flow-through cells 42 vertical to an axial direction or an end surface shape which is a shape which appears on the end surface as shown in FIG. 1 is a hexagonal shape. A main forming raw material or aggregate particles of the honeycomb structure 40 is, for example, a cordierite forming raw material such as alumina, kaolin or talc, or silicon carbide.

[Honeycomb Structure Forming Die] The honeycomb structure 40 as an example of the honeycomb structure is obtained by extruding a forming raw material which is the kneaded clay by use of an extrusion forming machine to obtain a honeycomb formed body and firing the honeycomb formed body. The extrusion forming machine includes a honeycomb structure forming die.

Figure 2A:
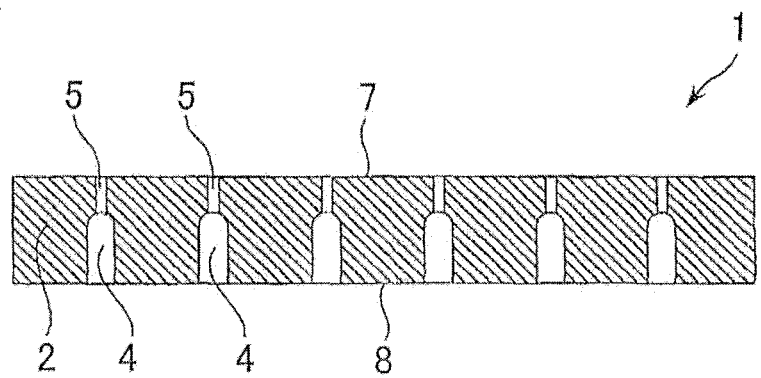
FIG. 2A is a sectional view schematically showing an example of a honeycomb structure forming die.
Figure 2B:
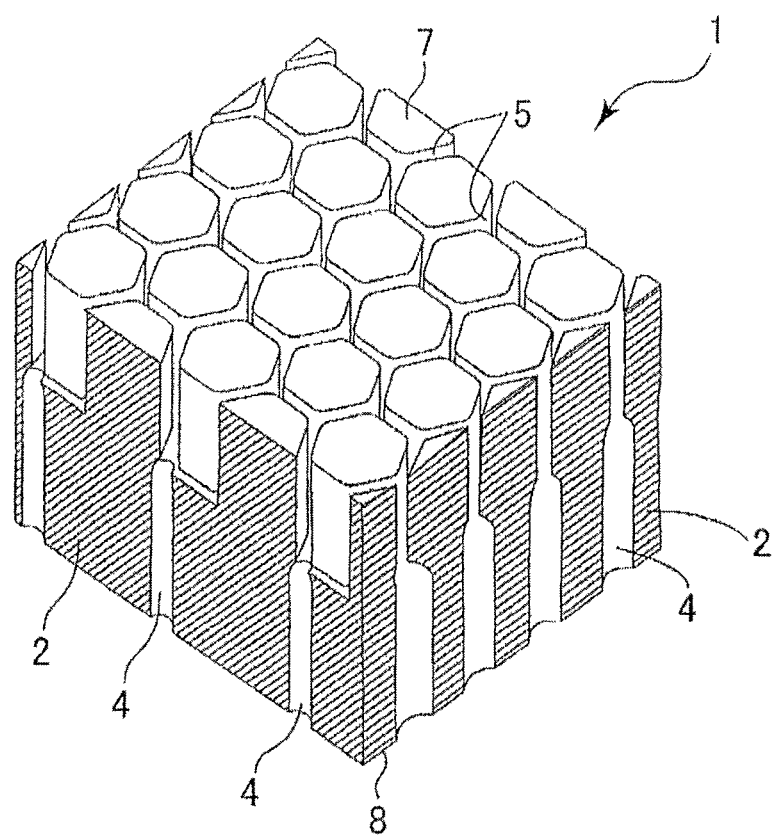
FIG. 2B is a partially enlarged perspective view schematically showing the example of the honeycomb structure forming die.
Figure 2C:
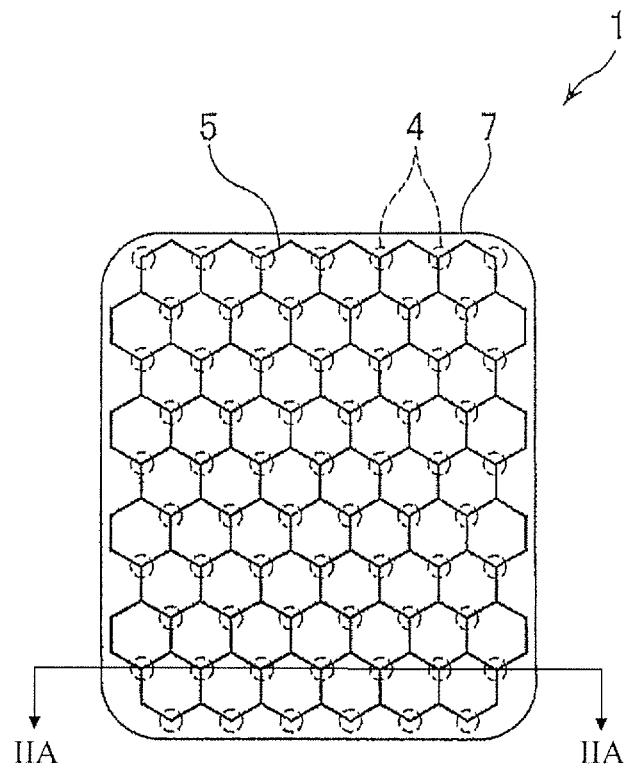
FIG. 2C is a plan view schematically showing the example of the honeycomb structure forming die.

For example, a die 1 which is the honeycomb structure forming die shown in FIG. 2A to FIG. 2C is constituted of a die base body 2 showing a thick plate-like or rectangular parallelepiped shape and having one surface 7 and another surface 8. In the other surface 8, introduction holes 4 through which the forming raw material is introduced are formed, and in the one surface 7, slits 5 which communicate with the introduction holes 4 are formed. As understood by comparison between FIG. 1 and FIG. 2B, a shape shown by the slits 5 which are spaces corresponds to that shown by the porous partition walls 41 of the honeycomb structure 40 which are substantive parts, and both the shapes are a hexagonal shape. Moreover, a width of each of the slits 5 corresponds to a thickness of each of the porous partition walls 41 of the honeycomb structure 40. A size or the diameter of each of the introduction holes 4 of the die 1 is larger than the width of each of the slits 5, and the introduction holes are provided at positions where the slits 5 intersect (see FIG. 2C). A material constituting the die 1 or the die base body 2 is a metal or an alloy, and examples of the material include metals such as iron (Fe), titanium (Ti), nickel (Ni), copper (Cu) and aluminum (Al), an alloy containing these metals, for example, a stainless steel alloy such as SUS630, and tungsten carbide based cemented carbide.

[Electrode for Honeycomb Structure Forming Die] Moreover, the die 1 as an example of the die is obtained by forming introduction holes and slits in a die base body in which any introduction hole or slit is not formed. At this time, an electrode for the honeycomb structure forming die is used to form, for example, hexagonal slits in the die base body in which any introduction hole or slit is not formed.

Figure 3A:
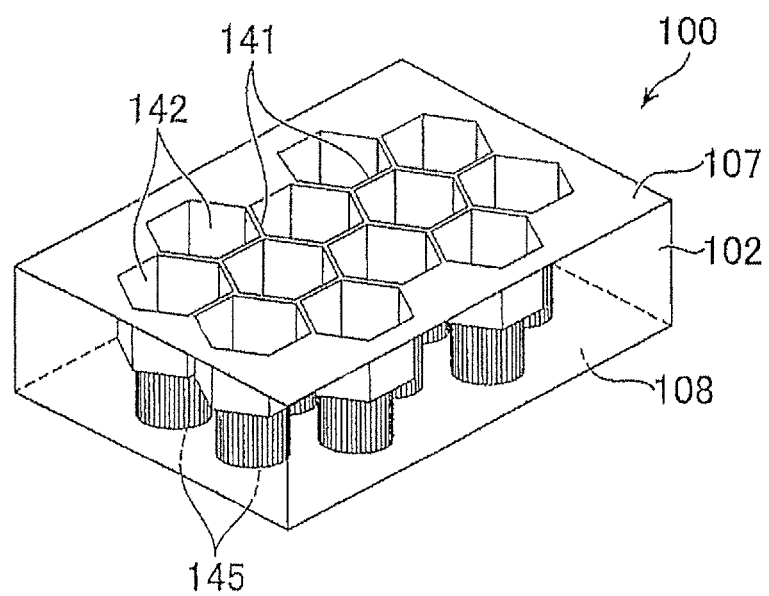
FIG. 3A is a perspective view showing an embodiment of an electrode for a honeycomb structure forming die manufactured by a manufacturing method of the electrode for the honeycomb structure forming die according to the present invention, as seen through the inside of the electrode from one surface side.
Figure 3B:
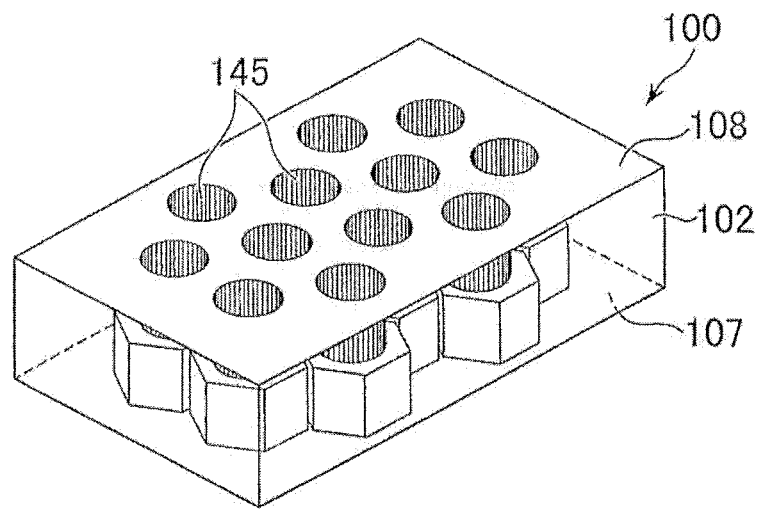
FIG. 3B is a perspective view of the electrode for the honeycomb structure forming die shown in FIG. 3A as seen through the inside of the electrode from the other surface side.

A honeycomb electrode 100 shown in FIG. 3A and FIG. 3B has an electrode base body 102, and on one surface 107 of the electrode base body 102, a plurality of electrode cells 142 partitioned by electrode partition walls 141 appear. A sectional shape of the electrode cells 142 is a hexagonal shape. When the one surface 107 is seen, it is possible to confirm that a shape corresponding to an end surface shape of the honeycomb structure 40 (see FIG. 1) appears as shown in FIG. 3A. The sectional shape of the surface which is vertical to an axial direction is also the same. Moreover, in another surface 108 side of the electrode base body 102, round holes 145 which communicate with the electrode cells 142 are formed. The round holes 145 are through holes having a round sectional shape. The sectional shape of the round holes 145 is a shape which appears on a section of the electrode base body 102 vertical to a direction which connects two surfaces, i.e., the one surface 107 and the other surface 108 of the electrode base body 102. In the honeycomb electrode 100, only portions that partition the plurality of electrode cells 142; in other words, only each portion between the electrode cell 142 and the electrode cell 142 are constituted of the electrode partition walls 141. In one of the electrode cells 142, a portion of the cell which is not adjacent to the other electrode cell 142 does not become the electrode partition wall 141, and is the electrode base body 102 itself. On this outer peripheral side, an unprocessed portion of the electrode base body is referred to as a fringe portion sometimes in the present description.

Figure 9:
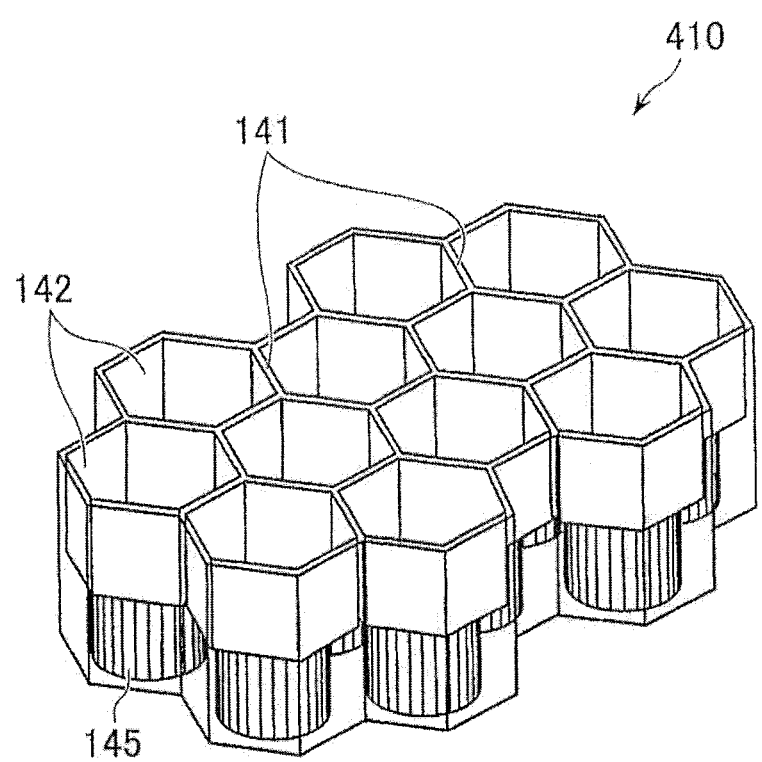
FIG. 9 is a perspective view showing a further embodiment of the electrode for the honeycomb structure forming die manufactured by the manufacturing method of the electrode for the honeycomb structure forming die according to the present invention, as seen through the inside of the electrode.

In a honeycomb electrode 410 (an electrode for a honeycomb structure forming die) shown in FIG. 9, a plurality of electrode cells 142 appear only on one surface in the same manner as in the honeycomb electrode 100. However, the honeycomb electrode 410 does not include a fringe portion. In a portion of the honeycomb electrode 410 which occupies generally about a half of a volume formed by the electrode cells 142, not only portions which partition the plurality of electrode cells 142 but also portions where one electrode cell 142 is not adjacent to the other electrode cell 142 are constituted of electrode partition walls 141. In other words, the portion of the honeycomb electrode 410 which occupies generally about the half of the volume, i.e., the upper side in FIG. 9 is constituted only of the electrode partition walls 141 which partition the plurality of electrode cells 142, and another portion corresponding to the electrode base body is not present in the honeycomb electrode 410. However, the thin electrode partition walls 141 are not formed in the other surface of the honeycomb electrode 410 on which the electrode cells 142 do not appear in the same manner as in the honeycomb electrode 100. The portion which occupies generally about the half of the volume, i.e., the bottom side in FIG. 9 is only provided with a plurality of round holes 145, and hence the whole honeycomb electrode 410 has a high strength.

Figure 4:
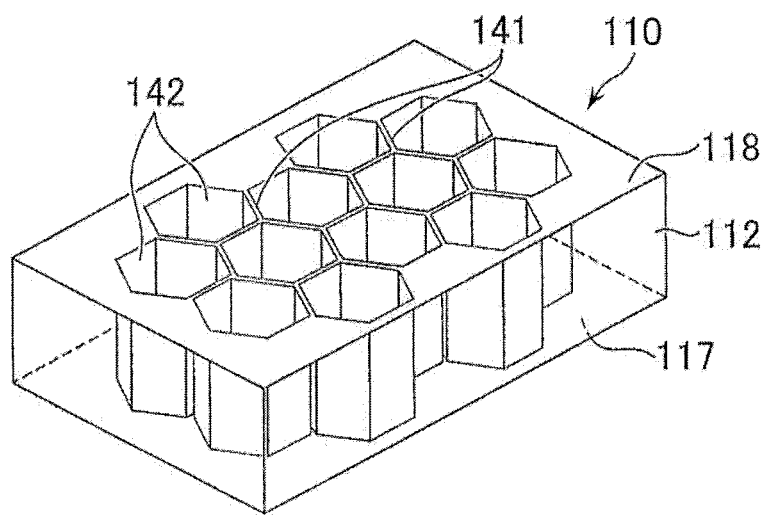
FIG. 4 is a perspective view showing another embodiment of the electrode for the honeycomb structure forming die manufactured by the manufacturing method of the electrode for the honeycomb structure forming die according to the present invention, as seen through the inside of the electrode.

A honeycomb electrode 110 shown in FIG. 4 is constituted of an electrode base body 112 in conformity to the honeycomb electrode 100. A sectional shape of the electrode cells 142 is a hexagonal shape. In the honeycomb electrode 110, a plurality of electrode cells 142 partitioned by electrode partition walls 141 appear on both of one surface 117 and another surface 118. That is, the electrode cells 142 passes through a portion between two surfaces of the electrode base body 112 in the honeycomb electrode 110. Even when either the one surface 117 or the other surface 118 of the honeycomb electrode 110 is seen, a shape corresponding to an end surface shape or a sectional shape of the honeycomb structure 40 appears. The electrode includes a fringe portion in the same manner as in the honeycomb electrode 100.

Figure 5:
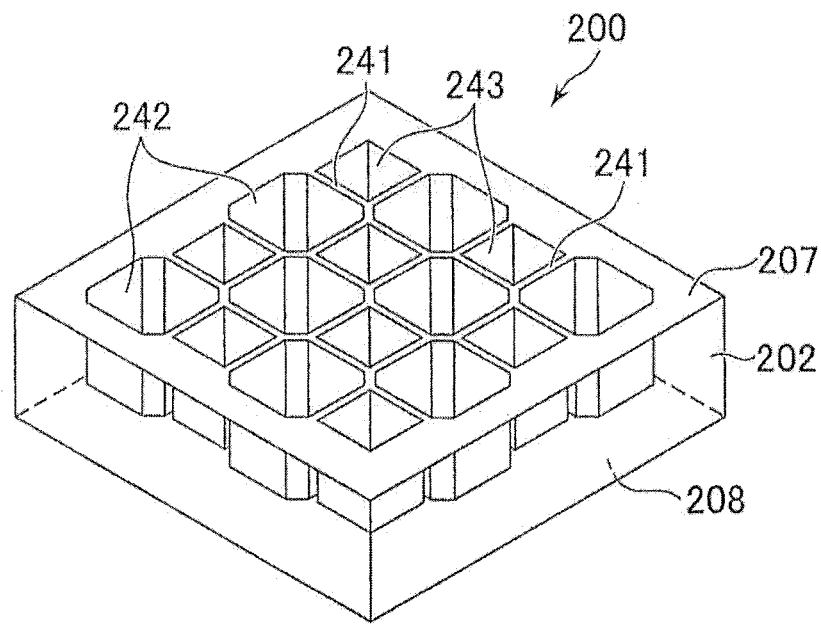
FIG. 5 is a perspective view showing still another embodiment of the electrode for the honeycomb structure forming die manufactured by the manufacturing method of the electrode for the honeycomb structure forming die according to the present invention, as seen through the inside of the electrode.

A honeycomb electrode 200 shown in FIG. 5 includes an electrode base body 202, and on one surface 207 of the electrode base body 202, a plurality of electrode cells 242 and 243 partitioned by electrode partition walls 241 alternately appear. A sectional shape of the large electrode cells 242 is an octagonal shape or a quadrangular shape with four rounded corners, and a sectional shape of the small electrode cells 243 is a quadrangular shape. On both of the one surface 207 and another surface 208 of the honeycomb electrode 200, the plurality of electrode cells 242 and 243 partitioned by the electrode partition walls 241 appear. In the honeycomb electrode 200, the electrode cells 242 and 243 pass through a portion between the two surfaces of the electrode base body 202. On the one surface 207 and the other surface 208 of the honeycomb electrode 200, part of a shape corresponding to an end surface shape or a sectional shape of a honeycomb structure to be finally obtained appears. Therefore, it is possible to form the honeycomb structure in which the sectional shapes of the flow-through cells are a large octagonal shape and a small quadrangular shape, by a die obtained through the honeycomb electrode 200. Moreover, this electrode includes a fringe portion in the same manner as in the honeycomb electrodes 100 and 110. In the honeycomb electrode 200, only portions that partition the plurality of electrode cells 242 and 243; in other words, only each portion between the electrode cell 242 and the electrode cell 243 are constituted of the electrode partition walls 241. A portion of one electrode cell 242 or 243 which is not adjacent to the other electrode cell 242 or 243 does not become the electrode partition walls 241, and is the electrode base body 202 itself.

Next, there will be described a manufacturing method of the electrode for the honeycomb structure forming die, a method of manufacturing the honeycomb structure forming die and a method of manufacturing the honeycomb structure according to the present invention. As the manufacturing method of the honeycomb structure forming die and the manufacturing method of the honeycomb structure, known means can be employed.

[Manufacturing Method of Electrode for Honeycomb Structure Forming Die] As to the manufacturing method of the electrode for the honeycomb structure forming die according to the present invention, first, the manufacturing of the honeycomb electrode 100 will be described as an example with reference to FIG. 6A, FIG. 6B and FIG. 7.

First, there is prepared a thick plate-like electrode base body which is made of an electricity discharging material and has two surfaces and in which any hole is not processed. This electrode base body is processed to become the electrode base body 102 later, and can be obtained by cutting a commercially available plate-like material into a desirable size. As the electricity discharging material for use as the electrode base body, for example, a copper tungsten alloy, a silver tungsten alloy, copper, carbon graphite or the like can be used. More specifically, the copper tungsten alloy containing Cu at 50 mass and W at 50 mass has advantages that boring with a drill or the like is enabled, that conductivity and melting point are high, and hence excels in corrosion resistance and wear resistance, and that electricity discharge characteristics are satisfactory and processing accuracy is high.

Figure 6A:
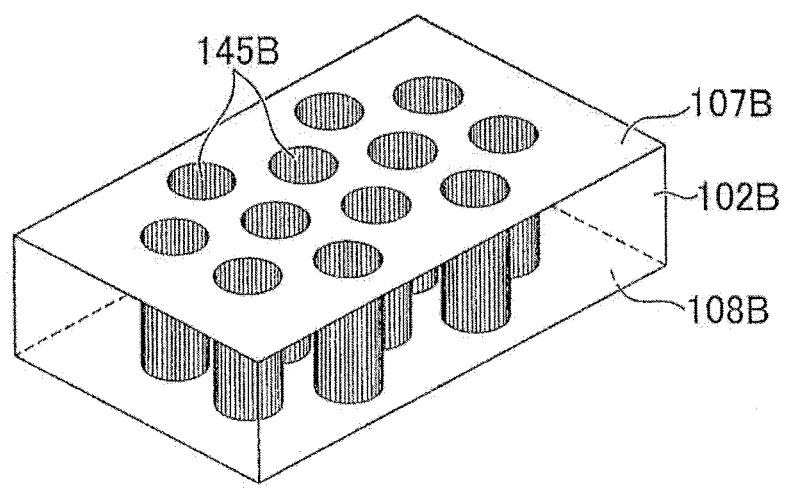
FIG. 6A is a perspective view schematically showing an embodiment of the manufacturing method of the electrode for the honeycomb structure forming die according to the present invention, and showing a state that a plurality of through holes are made in an electrode base body as seen through the inside of the electrode base body.
Figure 6B:
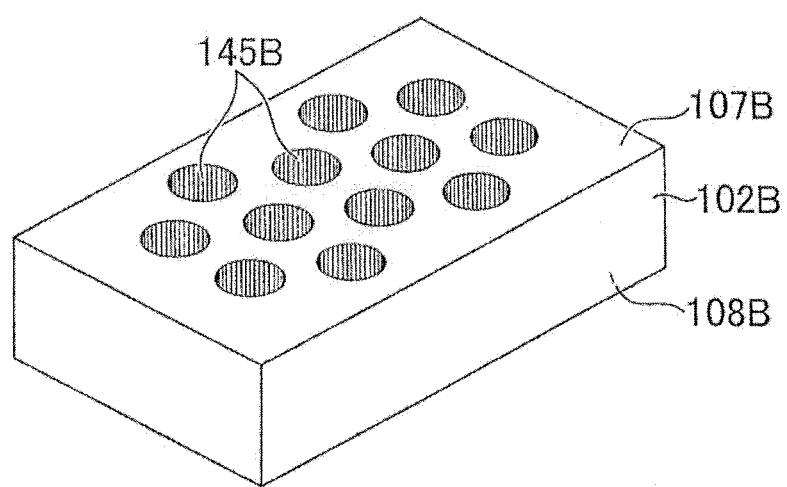
FIG. 6B is a perspective view showing the electrode base body in which the plurality of through holes are made as shown in FIG. 6A, and is not a seen-through view.
Figure 7:
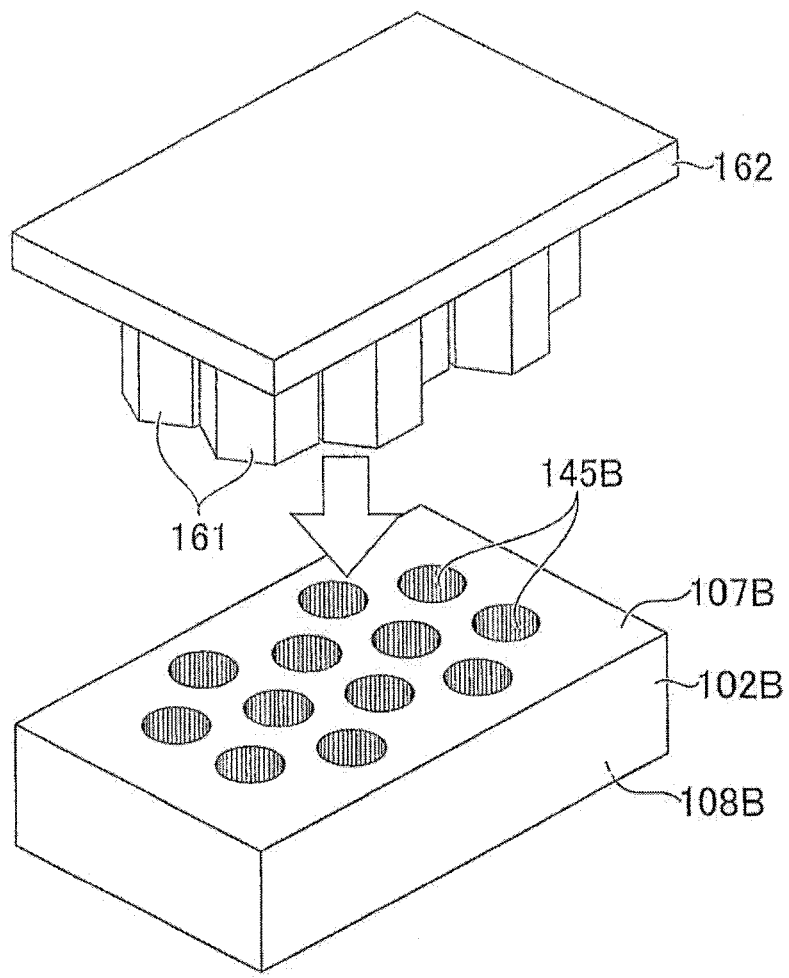
FIG. 7 is a perspective view schematically showing the embodiment of the manufacturing method of the electrode for the honeycomb structure forming die according to the present invention, and showing a state that a plurality of processing electrodes having a shape which is complementary to that of a plurality of flow-through cells (of a honeycomb structure) are to be arranged at positions corresponding to the flow-through cells (of the honeycomb structure) in one surface (of an electrode base body)

Next, in the electrode base body, a plurality of round holes 145B which pass through one surface 107B and the other surface 108B are made, to obtain an electrode base body 102B (see FIG. 6A, FIG. 6B and FIG. 7). The round holes 145B can be made by subjecting the electrode base body 102B to, for example, the boring with a drill. It is to be noted that FIG. 6A shows a state when seeing through the inside of the electrode base body, and in FIG. 6B, the inside thereof is not seen through. Also in FIG. 3A, FIG. 3B, FIG. 4 and FIG. 5 described above, an actual outer shape when not seen through appears only on one surface in conformity to the configuration shown in FIG. 6B. In the electrode base body 102B, the plurality of round holes 145B are made at positions corresponding to, for example, the flow-through cells 42 of the honeycomb structure 40. That is, positions to be provided with the plurality of round holes 145B are determined on the basis of design, e.g., a flow-through cell size, a flow-through cell pitch, etc. of the honeycomb structure to be finally obtained. This round hole can be regarded as a space having a columnar shape. In this case, a space between center axes of the round holes 145B can be from about 0.50 to 2.50 mm. Moreover, a radius of a circle which is vertical to the center axis can be from about 0.30 to 1.20 mm.

Next, a plurality of processing electrodes 161 having a shape which is complementary to that of the flow-through cells 42 are arranged at positions corresponding to the plurality of round holes 145B, i.e., the positions corresponding to the flow-through cells 42 of the honeycomb structure 40 in the one surface 107B of the electrode base body 102B. A shape of the flow-through cells 42 which are small partitions is a hexagonal column, and a shape of the processing electrodes 161 is substantially a hexagonal column. Moreover, electricity is discharged from the processing electrodes 161 having a substantive hexagonal column shape toward the one surface 107B of the electrode base body 102B, and carving is advanced to about a half of a depth of the electrode base body 102B (see FIG. 3A), specifically, the depth is, for example, from about 1 to 10 mm, to form the electrode cells 142 as hexagonal column small partitions or spaces. The depth of each of the electrode cells 142 needs to be not less than a depth of each slit of a die to be prepared by at least the obtained honeycomb electrode. As described above, the honeycomb electrode 100 is obtained (see. FIG. 7 and FIG. 3A). It is to be noted that a remaining portion of each of the round holes 145B in a depth direction becomes the round hole 145 as it is (see FIG. 3B).

The processing electrodes 161 are preferably made of carbon graphite. The plurality of processing electrodes 161 are integrated through a support portion 162, and hence the arranging and electricity discharging of the plurality of processing electrodes 161 can be performed at a time.

In the honeycomb structure to be finally obtained, a shape of the flow-through cells, e.g., hexagonal cells is a regular polygon, and the cells are preferably arranged at equal intervals as in the honeycomb structure 40. Therefore, any of the above processing electrodes is a regular polygon, and the processing electrodes need to be integrated at equal intervals. The processing electrodes integrated in this manner can usually be prepared by processing a block material of carbon graphite or the like with a machining center or the like. However, needless to say, a tool diameter becomes small for processing the material at narrow intervals, and it is difficult to process the material accurately. Therefore, instead of integrating all the required processing electrodes 161 through one support portion 162 as shown in FIG. 7, the processing electrodes can partially, e.g., alternately be arranged and integrated. In this case, the tool diameter may be large, which enables the accurate processing. In consequence, if the plurality of processing electrodes are partially integrated through the support portion, the number of times of electric discharge machining is divided into a plurality of times, which enables the preparation of the honeycomb electrode including thin walls.

The electricity discharging can be performed by immersing the electrode base body 102B and the processing electrodes 161 into, for example, an electric discharge machining oil. At this time, when the electric discharge machining oil is sucked or jetted through the round holes 145B from the side of the other surface 108B, sludge generated by the processing can be discharged right through portions to be processed along the flow of the electric discharge machining oil.

Figure 8:
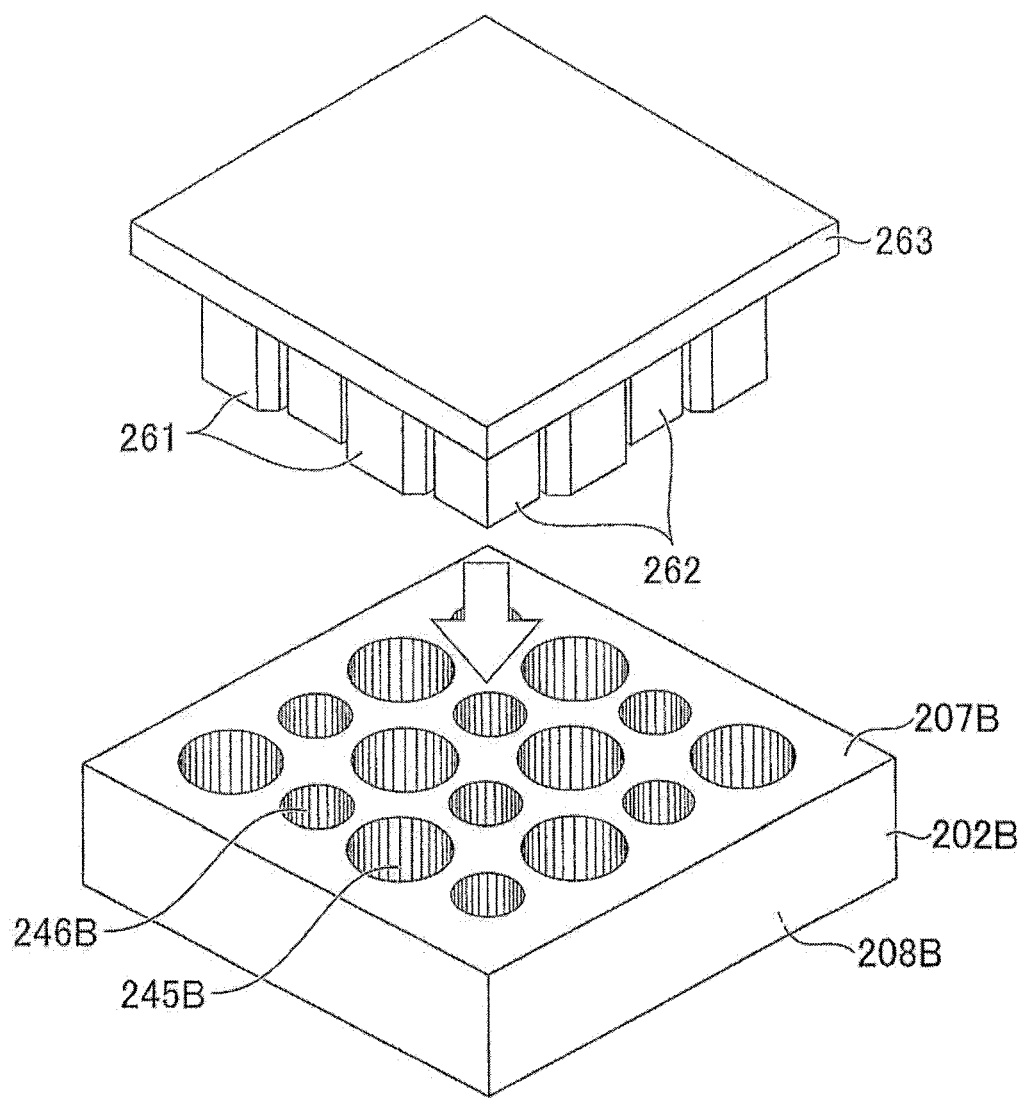
FIG. 8 is a perspective view schematically showing another embodiment of the manufacturing method of the electrode for the honeycomb structure forming die according to the present invention, and showing a state that a plurality of processing electrodes having a shape which is complementary to that of a plurality of flow-through cells (of a honeycomb structure) are to be arranged at positions corresponding to the flow-through cells (of the honeycomb structure) in one surface (of an electrode base body)

Next, the manufacturing of the honeycomb electrode 200 will be described as an example with reference to FIG. 5 and FIG. 8. As described above, it is possible to form the honeycomb structure in which sectional shapes of the flow-through cells are a large octagonal shape and a small quadrangular shape, through the die obtained by the honeycomb electrode 200. The shapes of the flow-through cells as small partitions are a large octagonal column and a small quadrangular column.

First, in the same manner as in the honeycomb electrode 100, there is prepared a thick plate-like electrode base body which is made of an electricity discharging material and has two surfaces. This electrode base body becomes the electrode base body 202 later, and a material thereof conforms to the case where the honeycomb electrode 100 is prepared as described above. Next, a plurality of round holes 245B, 246B which pass through one surface 207B and another surface 208B are made in the electrode base body, to obtain an electrode base body 202B (see FIG. 8). The round holes 245B, 246B can be made by subjecting the electrode base body 202B to, for example, boring with a drill. In the electrode base body 202B, a plurality of round holes 245B, 246B are made at positions corresponding to flow-through cells of the honeycomb structure to be finally obtained, sectional shapes of the flow-through cells being, for example, a large octagonal shape and a small quadrangular shape.

Then, a plurality of processing electrodes 261 and 262 having shapes which are complementary to those of the flow-through cells are arranged at positions corresponding to the plurality of round holes 245B, 246B, i.e., the positions corresponding to the flow-through cells whose sectional shapes are a large octagonal shape and a small quadrangular shape in the one surface 207B of the electrode base body 202B. Shapes of the flow-through cells which are small partitions are a large octagonal column and a small quadrangular column. Thus, a shape of the processing electrodes 261 is substantially a large octagonal column, and a shape of the processing electrodes 262 is substantially a small quadrangular column. Moreover, electricity is discharged from the processing electrodes 261 and 262 which are substantially the octagonal columns and the quadrangular columns toward the one surface 207B of the electrode base body 202B, and the carving of the electrode base body 202B is advanced to the other surface 208B (see FIG. 5), to form the electrode cells 242 which are octagonal columns and the electrode cells 243 which are quadrangular columns as small partitions or spaces. The electrode cells 242 and 243 pass through a portion between two surfaces of the electrode base body 202B which becomes the electrode base body 202 after the completion of the honeycomb electrode. As described above, the honeycomb electrode 200 is obtained (see FIG. 8 and FIG. 5).

It is to be noted that in conformity to the case where the honeycomb electrode 100 is prepared, the processing electrodes 261 and 262 are preferably made of carbon graphite. Moreover, the plurality of processing electrodes 261 and 262 are integrated through a support portion 263, and hence the arranging and electricity discharging of the plurality of processing electrodes 261 and 262 can be performed at a time or at the same time. The electricity discharging itself can be performed by known means, and can be performed, for example, by immersing the electrode base body 202B and the processing electrodes 261 and 262 into an electric discharge machining oil.

On the surface of the honeycomb electrode on which the electrode cells appear, all or part of the shape corresponding to the sectional shape or the end surface shape of the honeycomb structure appears. The honeycomb electrode 200 is used to prepare the die, when obtaining the honeycomb structure including flow-through cells having a large octagonal sectional shape and flow-through cells having a small quadrangular sectional shape.

It is to be noted that as described above, the respective drawings are schematic views, and for facilitating the understanding of process steps, only 12 electrode cells are shown in FIG. 3A, FIG. 3B, FIG. 4 and FIG. 7. In FIG. 5 and FIG. 8, 12 electrode cells are shown. Either number is not necessarily a practically appropriate number. The honeycomb electrode including the fringe portion as in the honeycomb electrodes 100, 110 and 200 is used for preparing the honeycomb structure forming die or the full-size honeycomb electrode at a time, and hence in actual, the number of the electrode cells is determined on the basis of specifications of the honeycomb structure forming die to be obtained and further specifications of a honeycomb structure. On the other hand, also in the honeycomb electrode which does not include any fringe portion as in the honeycomb electrode 410, the number of the electrode cells is determined on the basis of the specifications of the honeycomb structure forming die to be obtained and further specifications of the honeycomb structure, but the number of the electrode cells may be small. This is because this type of structure forming die can be prepared by using in plural times a honeycomb electrode which does not include any fringe portion, i.e., the partial-size honeycomb electrode.

[Method of Manufacturing Honeycomb Structure Forming Die] There will be described, as an example, a case where the die 1 (see FIG. 2A to FIG. 2C) is manufactured by using the honeycomb electrode 100 as an example of the honeycomb electrode. First, there is prepared a thick plate-like die base body which is made of, for example, a commercially available stainless steel alloy (SUS630) and has two surfaces and in which any introduction hole or slit is not provided. This die base body becomes the die base body 2, when the introduction holes 4 and the slits 5 are provided.

Next, the introduction holes 4 which open in the thickness direction are formed in the die base body by known means, e.g., electrolytic machining (ECM), electric discharge machining (EDM); laser processing, machining such as drilling, or the like. The introduction holes 4 are formed at such positions as to communicate with intersecting portions of the slits 5 formed later and having a hexagonal shape (see FIG. 2C). According to the die 1 obtained in this manner, when the extrusion forming is performed, the forming raw material introduced through the introduction holes 4 can uniformly be spread all over the slits 5, and excellent forming properties can be realized.

Then, the electric discharge machining is performed from the surface of the die base body opposite to the surface thereof provided with the introduction holes 4 by use of the honeycomb electrode 100, to form the slits 5, whereby the die 1 having a shape which is complementary to that of the honeycomb electrode 100 can be obtained (see FIG. 2B). This electric discharge machining can be performed by using a usual NC electric discharge machine and an electric discharge machining oil, while the honeycomb electrode 100 is arranged on the surface opposite to the surface provided with the introduction holes 4 of the electrode base body.

It is to be noted that, for example, the honeycomb electrode 100 includes the fringe portion. Therefore, in actual, the configuration, the number and the like of the electrode cells and electrode partition walls are determined on the basis of the specifications, i.e., the configuration, the number and the like of the slits of the die 1 to be obtained as described above.

[Method of Manufacturing Honeycomb Structure] First, a cordierite forming raw material obtained by mixing, for example, alumina, kaolin and talc is used. For example, 5 parts by mass of binder such as methylcellulose or the like and 20 parts by mass of dispersion medium such as water or the like are mixed with 100 parts by mass of cordierite forming raw material, followed by kneading, to obtain a kneaded clay.

Next, when the obtained kneaded clay is extruded by the extrusion forming machine to which the die 1 is attached, the kneaded clay introduced through the introduction holes 4 moves toward the slits 5, and is extruded through openings of the slits 5 on a side opposite to the introduction holes 4, to obtain a honeycomb formed body. Then, the honeycomb formed body is fired, whereby the honeycomb structure 40 can be obtained as an example of the honeycomb structure.

It is to be noted that in the die for preparing the honeycomb structure or the honeycomb formed body at a time, the configuration, the number and the like of the slits are determined on the basis of the specifications of the honeycomb structure or the honeycomb formed body to be obtained, i.e., the configurations, the numbers and the like of the porous partition walls and flow-through cells in the same manner as in a relation between the honeycomb electrode and the die. Moreover, a plurality of honeycomb formed bodies (segments) having a schematically prism shape are obtained by use of, for example, the die 1 having a configuration shown in FIG. 2C, and the bodies are bonded. Afterward, an outer shape of the bonded formed bodies is processed into a columnar shape, whereby it is possible to obtain the honeycomb structure 40 shown in FIG. 1.

INDUSTRIAL APPLICABILITY

A manufacturing method of an electrode for a honeycomb structure forming die according to the present invention is preferably utilized as means for manufacturing the honeycomb electrode for use in processing the die. This die is to be used for forming a honeycomb structure which is often used as a filter or a catalyst carrier.

EXPLANATION OF REFERENCE NUMERALS

1: die (honeycomb structure forming die), 2: die base body, 4: introduction hole, 5: slit, 7: one surface (of the die), 8: the other surface (of the die), 40: honeycomb structure, 41: porous partition wall, 42: flow-through cell, 100, 110, 200 and 410: honeycomb electrode (electrode for the honeycomb structure forming die), 102 and 112: electrode base body (of the honeycomb electrode), 102B: electrode base body (before becoming the honeycomb electrode), 107: one surface (of the honeycomb electrode), 107B; one surface (of the electrode base body before becoming the honeycomb electrode), 108: the other surface (of the honeycomb electrode), 108B: the other surface (of the electrode base body before becoming the honeycomb electrode), 117: one surface (of the honeycomb electrode), 118: the other surface (of the honeycomb electrode), 141: electrode partition wall, 142: electrode cell, 145: round hole (of the honeycomb electrode), 145B: round hole (of the electrode base body before becoming the honeycomb electrode), 161: processing electrode, 162: support portion, 202: electrode base body (of the honeycomb electrode), 202B: electrode base body (before becoming the honeycomb electrode), 207: one surface (of the honeycomb electrode), 207B: one surface (of the electrode base body before becoming the honeycomb electrode), 208: the other surface (of the honeycomb electrode), 208B: the other surface (of the electrode base body before becoming the honeycomb electrode), 241: electrode partition wall, 242: electrode cell, 243: electrode cell, 245B, 246B: plurality of round holes, 261: processing electrode, 262: processing electrode, and 263: support portion.

The invention claimed is:

1. A method for manufacturing an electrode for a honeycomb structure forming die which forms a honeycomb structure including a plurality of flow-through cells partitioned by porous partition walls, the method comprising:
   preparing a plate-like electrode base body made of an electricity discharging material and having two surfaces;
   arranging one or more processing electrodes having a shape, which is complementary to that of the flow-through cells, at positions corresponding to the plurality of flow-through cells in one of the surfaces of the electrode base body;
   discharging electricity from the one or more processing electrodes toward the surface of the electrode base body to carve the electrode base body, so that a plurality of electrode cells having a shape which is analogous to that of the flow-through cells are formed in the electrode base body;
   whereby obtaining the electrode where a plurality of electrode cells partitioned by electrode partition walls appear on at least one of the surfaces thereof.

2. The method for manufacturing the electrode for the honeycomb structure forming die according to claim 1, wherein a plurality of holes are made at positions of the electrode base body corresponding to the plurality of flow-through cells before performing discharging the electricity.

3. The method for manufacturing the electrode for the honeycomb structure forming die according to claim 2, wherein the holes are through holes.

4. The method for manufacturing the electrode for the honeycomb structure forming die according to claim 1, wherein when the plurality of processing electrodes are arranged, the plurality of processing electrodes are integrated through a support portion.

5. The method for manufacturing the electrode for the honeycomb structure forming die according to claim 1, wherein the sectional shape of the electrode cells is a hexagonal shape.

6. The method for manufacturing the electrode for the honeycomb structure forming die according to claim 1, wherein the sectional shapes of the electrode cells are an octagonal shape and a quadrangular shape.

* * * * *